（12） United States Patent
Printezis et al.

(10) Patent No.: US 7,660,961 B2
(45) Date of Patent: Feb. 9, 2010

(54) CONCURRENT EVACUATION OF THE YOUNG GENERATION

(75) Inventors: Antonios Printezis, Burlington, MA (US); Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 504 days.

(21) Appl. No.: 11/732,785

(22) Filed: Apr. 3, 2007

(65) Prior Publication Data

US 2008/0250088 A1 Oct. 9, 2008

(51) Int. Cl.
*G06F 12/00* (2006.01)
(52) U.S. Cl. .................. 711/165; 711/173; 707/206
(58) Field of Classification Search .................. 711/165, 711/173; 707/206
See application file for complete search history.

(56) References Cited

OTHER PUBLICATIONS

Click, C. et al., The Pauseless GC Algorithm, Jun. 12-12, 2005, pp. 46-56.
Detlefs, D., Flood, C., Heller, S., Printezis, T., "Garbage-First Garbage Collection", Copyright 2004, Sun Microsystems, Inc. ISMM'04, Oct. 24-25, 2004, Vancouver, British Columbia, Canada, pp. 37-48.
Bacon, D., Cheng, P., Rajan, V., "A Real-Time Garbage Collector with Low Overhead and Consistent Utilization", IBM T.J. Watson Research Center, POPL'03, Jan. 15-17, 2003, pp. 285-289.
Printezis, T., Detlefs, D., "A Generational Mostly-Concurrent Garbage Collector", ISMM '00, 2000, pp. 143-154.
Brooks, R., "Trading Data Space for Reduced Time and Code Space in Real-Time Garbage Collection on Stock Hardware", 1984 ACM, pp. 256-262.
Lieberman, H., Hewitt, C., "A Real-Time Garbage Collector Based on the Lifetimes of Objects", Communications of the ACM, Jun. 1983, pp. 419-429.
Baker, H., "List Processing in Real Time on a Serial Computer", Communications of the ACM, Apr. 1978, pp. 1-13.

*Primary Examiner*—Christian P Chace
*Assistant Examiner*—Hashem Farrokh
(74) *Attorney, Agent, or Firm*—Osha • Liang LLP

(57) ABSTRACT

The invention relates to a method for performing generational garbage collection on a heap comprising a plurality of generations. The method involves dividing a young generation of the heap into a first young generation and a second young generation, evacuating the first young generation concurrently with allocating the second young generation, and evacuating the second young generation concurrently with allocating the first young generation and subsequent to fully evacuating the first young generation.

20 Claims, 10 Drawing Sheets

CONCURRENT EVACUATION OF THE YOUNG GENERATION

BACKGROUND

Garbage collection is an integral part of numerous programming languages. Modern systems supporting object-oriented programming typically allocate objects from a region of memory called the heap. When an object found in the heap becomes unreachable because all live references to the object have been removed, the object can no longer be used. However, the object continues to occupy memory space in the heap.

Garbage collection is a process that reclaims this unused memory space and makes it available to accommodate other objects. Garbage collection alleviates the burden of complex memory management from programmers by autonomously reclaiming memory spaces that are no longer used. Software developers can spend less time chasing memory management errors and develop programs with increased reliability. However, garbage collection has its costs, which include impact on performance, user perceived pauses, increased complexity, etc. To distinguish the part of the program that does useful work from that which does the garbage collection, the term mutator is sometimes used. From the garbage collector's point of view, the mutator mutates the active data structure's connectivity. In many examples, the garbage collection is performed in a "stop the world" fashion where the mutator is halted during the collection cycle. This halting of the mutator causes user perceived pauses, especially in applications where real time response is expected.

One of the most efficient types of garbage collectors is a generational garbage collector. In a generational garbage collector, new objects are allocated in a "young generation" area of the heap. If an object continues to be reachable over a specified number of garbage collection cycles, the object is promoted to one or more old generation areas of the heap. A generational garbage collector performs garbage collection more frequently on the young generation area of the heap to match typical program behavior where most newly created objects are short lived thus allowing memory space to be reclaimed quickly. Long lived objects in the old generation areas tend to persist in memory and do not need garbage collection as frequently.

Some garbage collectors also relocate reachable objects to battle fragmentation. When the garbage collection cycle occurs, objects identified as reachable are moved, or "evacuated" to designated areas of the heap. During garbage collection of the young generation, the designated areas may be the old generation, a "to-space" of the young generation, or a "survivor space" in the heap. The objects evacuated into the "to-space" or the "survivor space" may then be promoted into the old generation according to the collection policy. The collection policy on the old generation varies depending on the garbage collector. Throughput collectors may simply do full collections in each cycle and reclaim the old generation in its entirety. Low-latency collectors may collect the old generation in an incremental fashion in order to minimize user perceived pauses. In this latter case, the garbage collection on the young generation may limit how short the pause times can be.

SUMMARY

In general, in one aspect, the invention relates to a method for performing generational garbage collection on a heap comprising a plurality of generations. The method comprising dividing a young generation of the heap into a first young generation and a second young generation, evacuating the first young generation concurrently with allocating the second young generation, and evacuating the second young generation concurrently with allocating the first young generation and subsequent to fully evacuating the first young generation.

In general, in one aspect, the invention relates to a computer readable medium, embodying instructions executable by the computer to perform method steps for performing generational garbage collection on a heap. The instructions comprising functionality to divide a young generation of the heap into a first young generation and a second young generation, evacuate the first young generation concurrently with allocating the second young generation, and evacuate the second young generation concurrently with allocating the first young generation and subsequent to fully evacuating the first young generation.

In general, in one aspect, the invention relates to a computer system comprising a memory comprising a set of instructions, and a processor operatively coupled to the memory. The processor executes the set of instructions to divide a young generation of the heap into a first young generation and a second young generation, evacuate the first young generation concurrently with allocating the second young generation, and evacuate the second young generation concurrently with allocating the first young generation and subsequent to fully evacuating the first young generation.

DETAILED DESCRIPTION

Figure 1:
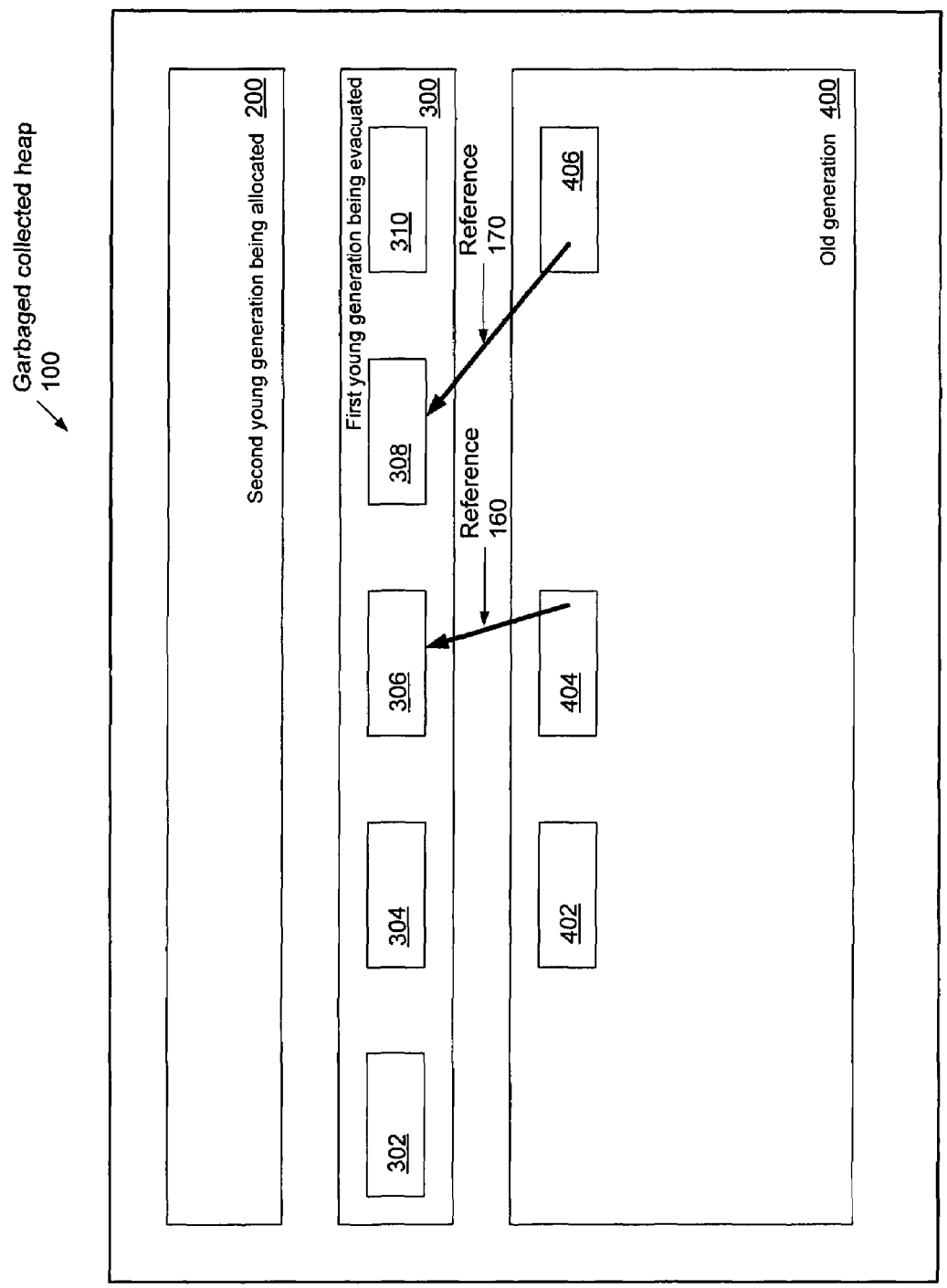
FIG. 1 shows a schematic diagram of a heap's organization into two young generations and an old generation in accordance with one or more embodiments of the invention.

An example of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, in one aspect, the invention relates to improving the user perceived pause time caused from a generational garbage collector by dividing the young generation into two young generations. In an example, new objects are allocated in the first young generation while reachable objects are concurrently evacuated from the second young generation. The mutator continues to execute concurrently without being halted throughout the majority of the garbage collection process for the young generation. When the first young generation is full, the two spaces exchange roles. Typically the evacuation from the second young generation completes prior to the first young generation becomes full. The operation of this generational garbage collector relies on a filtering write barrier which keeps track of references that need to be redirected after the first young generation is fully evacuated and before the two spaces can exchange roles.

FIG. 1 shows a schematic diagram of a heap's organization into a first young generation (300) and a second young generation (200) and an old generation (400) in accordance with one or more embodiments of the invention. Here, the garbage collected heap (100) may include two young generations, such as the first young generation (300) and the second young generation (200), and one or more old generations such as the old generation (400). A mutator (not shown) may, while performing multiple tasks, allocate new objects, such as the various objects (302, 304, 306, 308, and 310) shown in the first young generation (300). The old generation (400) may include objects previously evacuated from the young generations, such as the various objects (402, 404, and 406) shown in the old generation (400). Object (406) may include a reference (170) referencing object (308). Object (404) may include a reference (160) referencing object (306).

In the example in FIG. 1, the first young generation (300) is shown fully allocated and the second young generation (200) is shown fully evacuated. Accordingly, the two young generations are ready to exchange their roles.

One skilled in the art will appreciate that although the garbage collected heap (100) is shown as divided into three contiguous portions, in other examples each of the two young generations and the one or more old generations may not be contiguously organized in the garbage collected heap (100). Further, the two young generations may not be equal in size. Although only a relatively small number of objects are shown for purpose of illustration, each generation of the garbage collected heap (100) may include a relatively large number of objects, with each object varying in size.

Figure 2:
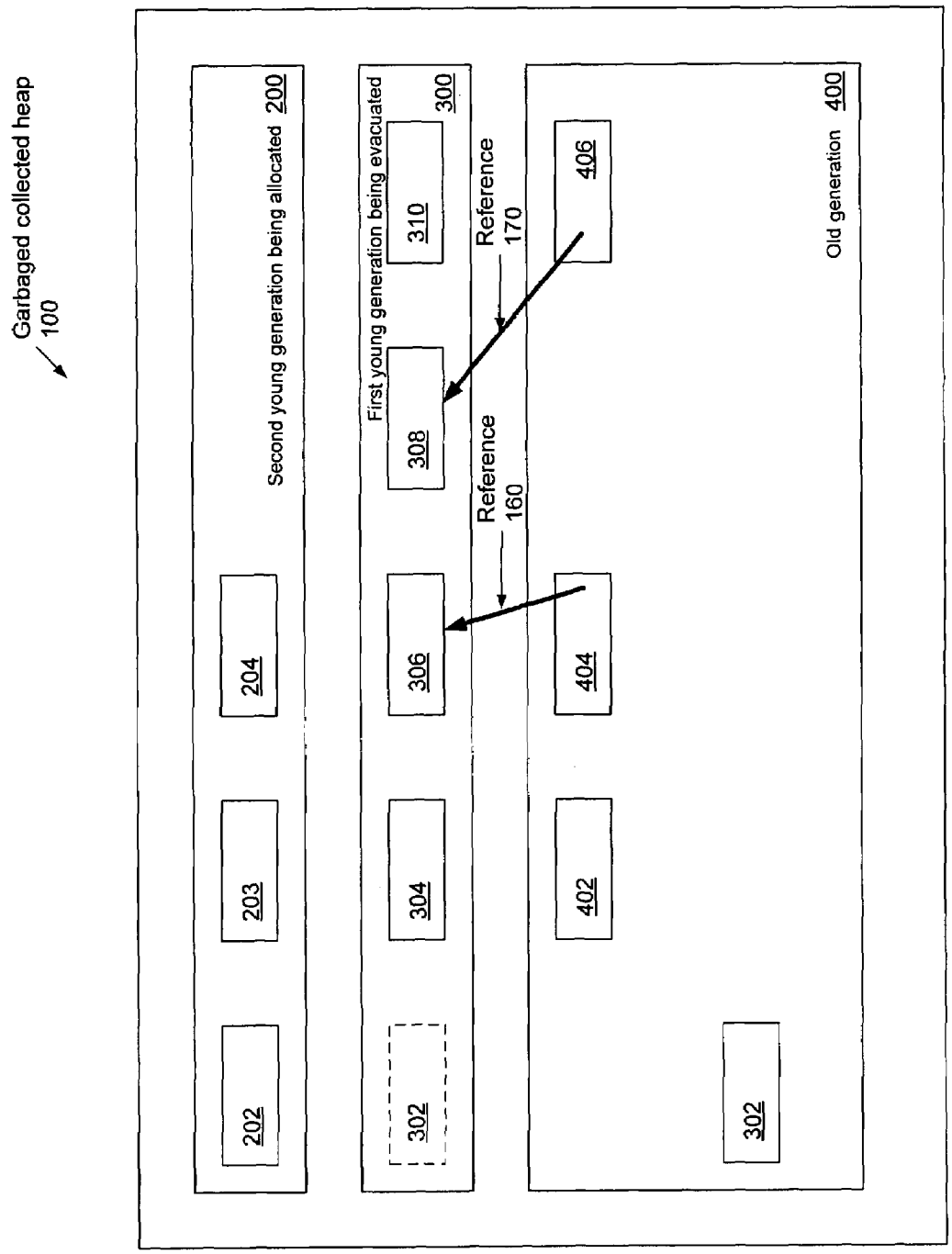
FIG. 2 shows a schematic diagram of a first young generation being evacuated concurrently with a second young generation being allocated in accordance with one or more embodiments of the invention.

FIG. 2 shows a schematic diagram of the first young generation (300) being evacuated while the second young generation (200) is concurrently allocated in accordance with one or more embodiments of the invention. Here, the garbage collected heap (100), the second young generation (200), the first young generation (300), and the old generation (400) are essentially the same as shown in FIG. 1 and include essentially the same objects except as discussed below.

As shown in FIG. 2, the first young generation (300) may include various objects (304, 306, 308, and 310). Compared to where object (302) resides in FIG. 1, object (302) is shown in FIG. 2 as evacuated from the first young generation (300) to the old generation (400). The evacuation of the object (302) is represented as a dashed outline in the first young generation (300). The notation of dashed outline is used in FIGS. 2-7 to represent evacuation of objects. Although not shown in detail, in some examples, object (302) may be evacuated first to a "to-space" or a "survivor space" in the young generation before being promoted to the old generation (400). The old generation (400) may also include other objects, such as object (402), object (404), and object (406). Object (406) may include a reference (170) referencing object (308). Object (404) may include a reference (160) referencing object (306). The mutator (not shown) may, while performing multiple tasks, allocate new objects such as object (202), object (203), and object (204) in the second young generation (200). In the example shown in FIG. 2, the garbage collector (not shown) evacuates the first young generation (300) concurrently with the mutator (not shown) allocating the second young generation (200). With the concurrent evacuation, the garbage collector (not shown) is not contributing to any pause in this period of the collection process while the mutator (not shown) continues to execute without being halted.

Figure 3:
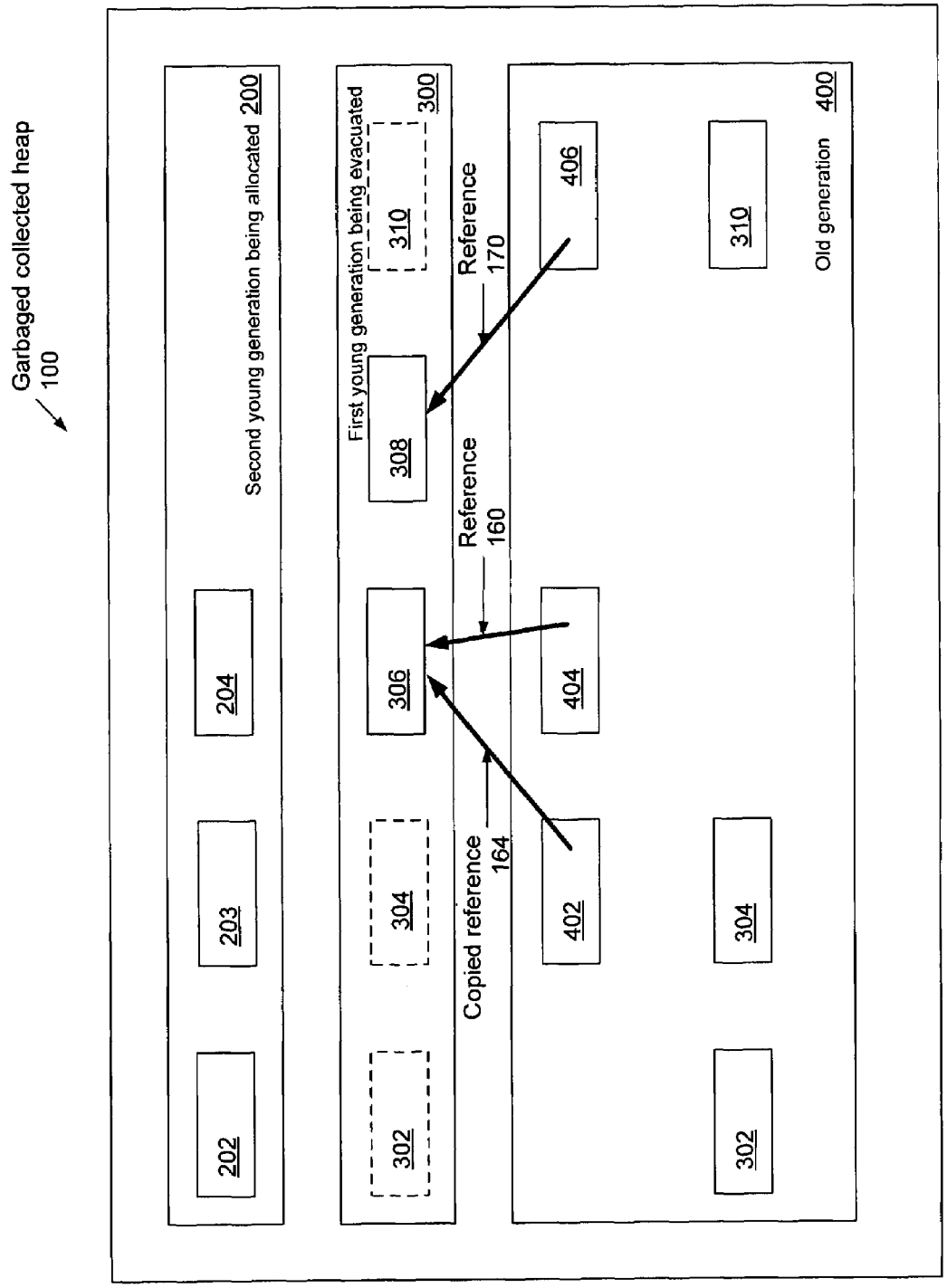
FIG. 3 shows a schematic diagram of a reference being copied in accordance with one or more embodiments of the invention.

FIG. 3 shows a schematic diagram of a reference being copied in accordance with one or more embodiments of the invention. Here, the garbage collected heap (100), the second young generation (200), the first young generation (300), and the old generation (400) are essentially the same as shown in FIG. 2 and include essentially the same objects except as discussed below.

As shown in FIG. 3, while the garbage collector (not shown) evacuates the first young generation (300), the mutator (not shown), among its multiple tasks, concurrently allocates the second young generation (200). The mutator (not shown) may copy, for example, the reference (160) to object (402) and create a copied reference (164). The copied reference (164) is included (or contained) in object (402) and references (or points to) object (306). In another example, object (304) and object (310) may be concurrently evacuated from the first young generation (300) to the old generation (400). Although not shown in detail, in some examples, object (304) and object (310) may be evacuated first to a "to-space" in the young generation or a "survivor space" in the heap before being promoted to the old generation (400).

Figure 4:
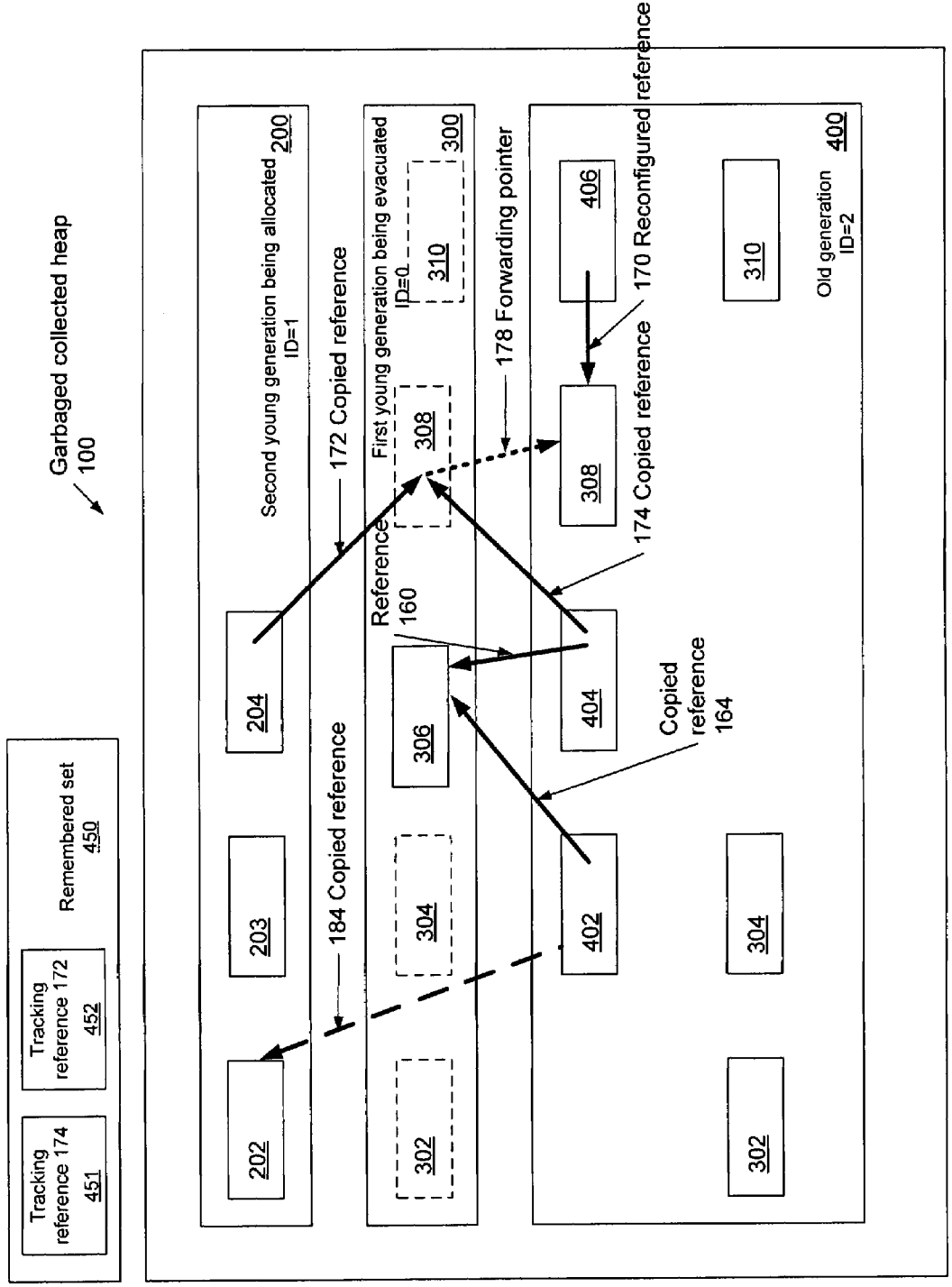
FIG. 4 shows a schematic diagram of references tracked in a remembered set in accordance with one or more embodiments of the invention.

FIG. 4 shows a schematic diagram of references tracked in a remembered set in accordance with one or more embodiments of the invention. Here, the garbage collected heap (100), the second young generation (200), the first young generation (300), and the old generation (400) are essentially the same as shown in FIG. 3 and include essentially the same objects except as discussed below. When comparing where object (308) resides in FIG. 3, object (308) is shown as evacuated from the first young generation (300) to the old generation (400) in FIG. 4. Although not shown in detail, in some examples, object (308) may be evacuated first to a "to-space" in the young generation or a "survivor space" before being promoted to the old generation (400). As shown in FIG. 4, the remembered set (450) includes the remembered set items (451) and (452) for tracking references (172) and (174). This is for illustration only, additional remembered set items may also be included as appropriate.

As part of the evacuation process, the garbage collector (not shown) may follow various reference chains leading to object (308) and reconfigure (e.g., update or redirect) those references if necessary. For example, the reference (170) is shown to be properly reconfigured and continues to reference object (308) after the evacuation. However, because of the concurrent nature of the mutator (not shown) executing without being halted during the evacuation of object (308), the mutator (not shown) may, for example, execute instructions to copy the reference (170) to object (404) while object (308) may be in the process of being evacuated.

For example, the mutator (not shown) may start to execute the instructions to copy the reference 170) to object (404) prior to object (308) being evacuated and start to create a copied reference (174). The garbage collector (not shown) may subsequently evacuate object (308) before the mutator (not shown) completes the instructions to properly configure the copied reference (174). The garbage collector (not shown) may therefore not reconfigure the reference (174), which then continues to point to the old location of object (308) in the first young generation (300). In one or more embodiments of the invention, the copied reference (such as the reference (174)) contained in an object in the old generation (e.g., object (404) in the old generation (400)) may point to an old location of an object in the young generation being evacuated (e.g., the old location of object (308) in the first young generation (300)). In another example, because of the concurrent nature of the mutator (not shown) executing copying instructions, a copied reference (e.g., the reference (172)) contained in an object in the young generation being allocated (e.g., object (204) in the second young generation (200)) may point to an old location of an object in the other young generation being evacuated (e.g., the old location of object (308) in the first young generation (300)).

In one or more embodiments of the invention, to ensure the proper operation of copied references, a forwarding pointer may be installed at each of the old locations of the evacuated objects, (e.g., forwarding pointer (178)). As known to those skilled in the art, a read barrier is code added to a read operation in the mutator code to trap attempts to read from locations protected by the read barrier. In one or more embodiments of the invention, a read barrier (not shown) is inserted in the mutator code to detect and use these forwarding pointers (e.g., forwarding pointer (178)) to reach the objects to be accessed, such as object (308). In one or more embodiments of the invention, the read barrier blocks access to an object being evacuated until the evacuation of the object is complete.

In one or more embodiments of the invention, any reference, contained in an object either in the young generation being allocated or in the old generation that references another object in the young generation being evacuated may be tracked and processed prior to the two young generations exchanging roles with each other. For example, the two young generations and the one or more old generation may be scanned in their entirety to detect such references. In another example, the young generation being evacuated may be scanned in its entirety to detect such references. Such approaches may cause negative impact on system performance and may not be desirable. In yet another example, these references may be tracked in a remembered set, such as the remembered set (450).

In one or more embodiments of the invention, only the remembered set is scanned for processing the forwarding pointers and associated copied references. For example, reference (174) and reference (172) may be tracked in the remembered set (e.g., by the remembered set items (451) and (452)) for processing later. The remembered set may be scanned for tracked references, the tracked references (e.g., reference (174) and reference (172)) may be reconfigured to pointing directly to object (308), and forwarding pointer (178) may be eliminated prior to the garbage collector (not shown) completing the collection process on the first young generation (300) and allowing the first young generation (300) and second young generation (200) to exchange roles (not shown in FIG. 4, but shown and described in reference to FIG. 5 below).

In another example, the mutator (not shown) may start executing instructions to create a reference (184) contained in object (402). The reference (184), for example, may be a result of copying another reference from another object (not shown). Because of the concurrent execution of the mutator (not shown) and the garbage collector (not shown), the mutator (not shown) may not complete the task to properly configure the reference (184) before the two young generations may exchange roles. The task includes checking whether the reference points to an object that has been moved, reading the forwarding reference from its old location, and then updating the reference. Accordingly, any reference, contained in an object in the old generation, that references another object in the young generation being allocated (e.g., the second young generation (200)), may also be tracked in the remembered set. Here, the reference (184) may be tracked along with reference (172) and reference (174) in the remembered set. One skilled in the art will appreciate that the remembered set may be implemented in many different formats known in the art such as a file, a list, or a card table commonly used in conjunction with the write barrier, or any other suitable data structure format.

Figure 5:
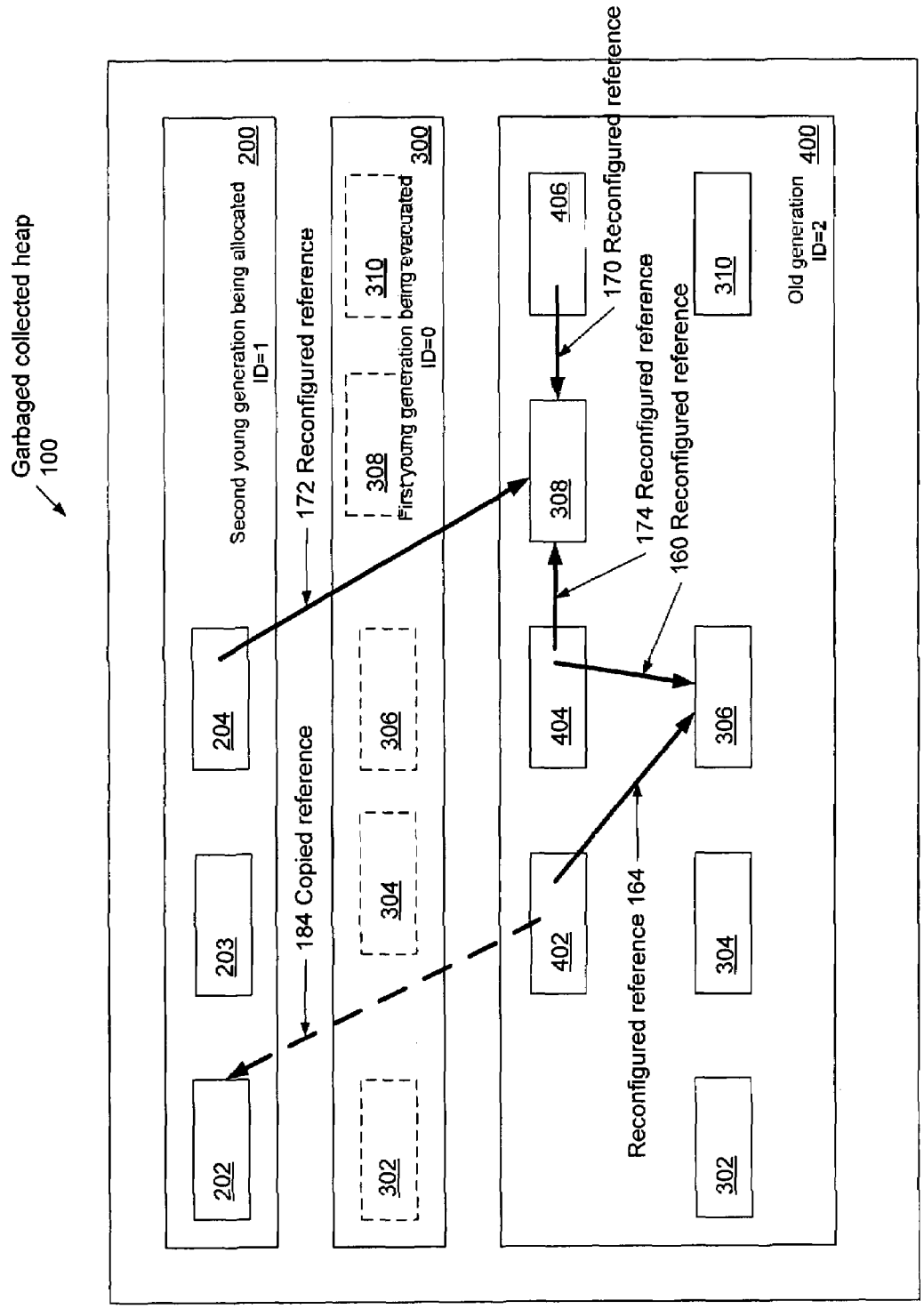
FIG. 5 shows a schematic diagram of the garbage collector completing the evacuation process on the first young generation in accordance with one or more embodiments of the invention.

FIG. 5 shows a schematic diagram for the garbage collector completing the evacuation process on the first young generation (300) in accordance with one or more embodiments of the invention. Here, the garbage collected heap (100), the second young generation (200), the first young generation (300), and the old generation (400) are essentially the same as shown in FIG. 4 and include essentially the same objects except as discussed below. For example, when comparing where object (306) and reference (160) and reference (164) reside in FIG. 4, object (306) and reference (160) and reference (164) are shown evacuated from the first young generation (300) to the old generation (400). Further, the remembered set of the first young generation (300) is scanned, the forwarding pointer (178) shown in FIG. 4 is eliminated, and reference (172) and reference (174) are reconfigured to point to object (308) in the old generation (400). Further, the tracked references are deleted from the remembered set after they are processed in this manner.

In one or more embodiments of the invention, the reference (184) in the remembered set may also be properly processed (e.g., visited and ignored) along with the reference (172) and reference (174). Alternatively, the reference (184) may be processed later prior to the garbage collector (not shown) eventually switches to evacuate the second young generation (200), in which case the remembered set continues to track the reference (184) until it is processed. Subsequent to this processing according to the remembered set, the garbage collector (not shown) may be ready to retire the first young generation (300) from the collection cycle. The two young generations may, for example at this point, exchange roles, in which case the mutator (not shown) may start allocating the first young generation (300) concurrently with the garbage collector (not shown) starting evacuation of the second young generation (200).

In one or more embodiments of the invention, the elimination of the forwarding pointers and the reconfiguration of associated copied references may be processed in the "stop the world" fashion while the mutator (not shown) may be halted. The read barrier, which may be in the process of redirecting using the forwarding pointer, may be allowed to complete, for example using a semaphore scheme, before the mutator (not shown) is halted. The pause time associated with the young generation garbage collection may therefore be significantly reduced comparing to halting the mutator (not shown) throughout the entire evacuation process.

Figure 6:
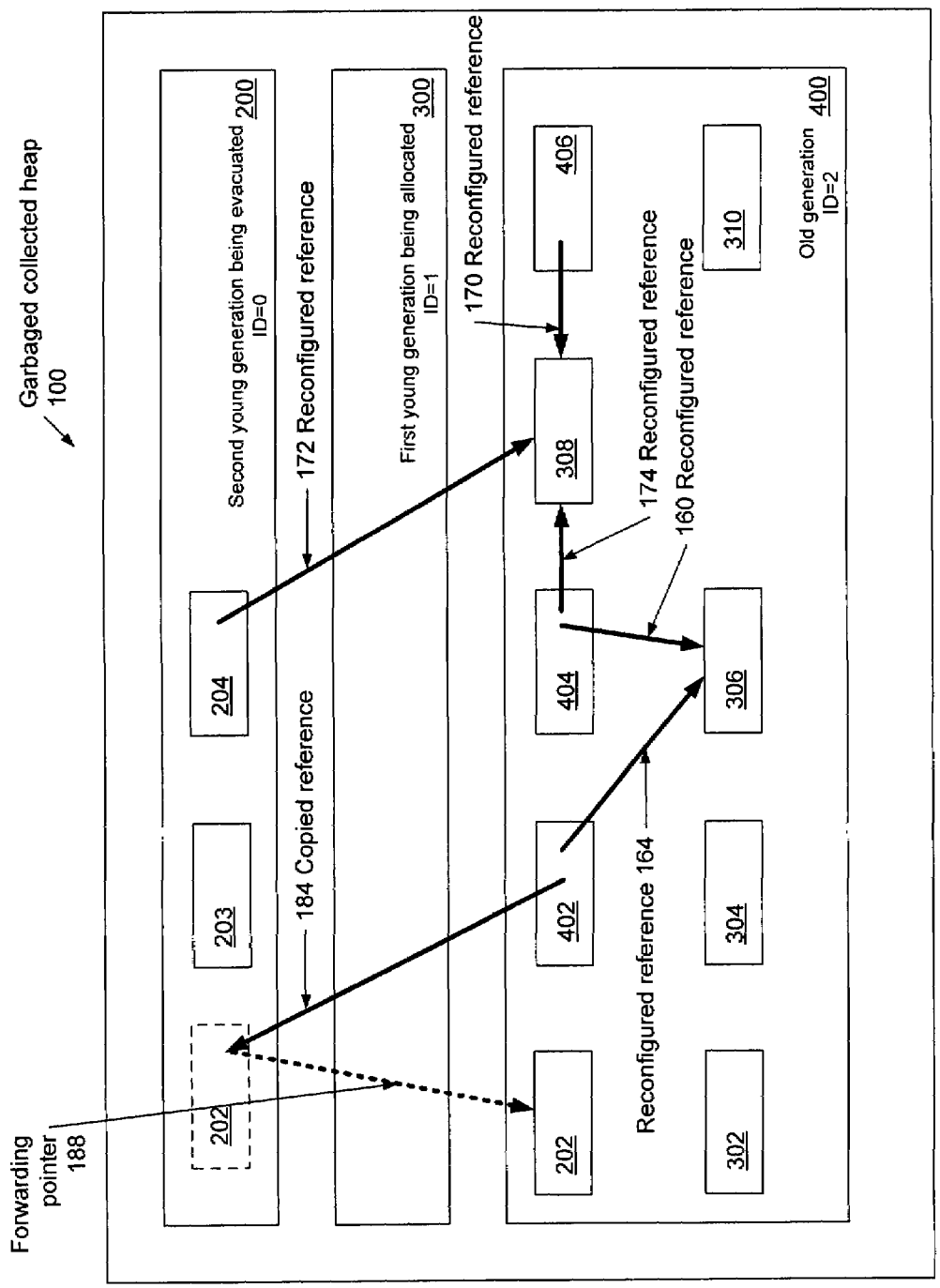
FIG. 6 shows a schematic diagram of the first young generation and second young generation exchanging roles in accordance with one or more embodiments of the invention.

FIG. 6 shows a schematic diagram of the first young generation and second young generation exchanging roles in accordance with one or more embodiments of the invention. Here, the garbage collected heap (100), the second young generation (200), the first young generation (300), and the old generation (400) are essentially the same as shown in FIG. 5 and include essentially the same objects except as discussed below.

As shown in FIG. 6, the mutator (not shown) may allocate the first young generation (300) concurrently with the evacuation of the second young generation (200). For example, when comparing where object (202) resides in FIG. 5, object (202) is shown evacuated to the old generation (400) in FIG. 6. Although not shown in detail, in some examples, object (202) may be evacuated first to a "to-space" in the young generation or a "survivor space" in the heap before being promoted to the old generation (400). As previously described in reference to FIG. 4, because of the concurrent execution of the mutator (not shown), the mutator (not shown) may start executing instructions to create the reference (184) but may not complete the proper configuration of the reference (184) before the two young generations may exchange their roles.

Shown as an example in FIG. 5, the reference (184) may point to an old location of the evacuated object (202) in the second young generation (200). A forwarding pointer (188) may be installed to ensure proper operation in conjunction with the read barrier described above. In one or more embodiment of the invention, the reference (184) may be tracked in the remembered set prior to, (and remains in the remembered set subsequent to) the two young generations exchanging their roles. The remembered set may eventually be scanned again for tracked references, the reference (184) may then be redirected to pointing to object (202) directly, and the forwarding pointer (188) may then be eliminated upon the garbage collector (not shown) completing the evacuation of the second young generation (200).

In one or more embodiments of the invention, the references, such as the reference (174) and reference (172), may be detected by way of a filtering write barrier (not shown) inserted in the mutator (not shown) code and configured to detect write instructions associated with the conditions described above. One skilled in the art will appreciate a write barrier is code added to a write operation in the mutator code to record information from which the garbage collector may determine where references may have been written.

The detection scheme may consider that the two young generations may exchange roles from time to time and that each young generation may not be contiguous in the garbage collected heap (100). In one or more embodiments of the invention, the detection scheme may be based on checking the address of an object containing the reference associated with the write instruction against the address ranges of each generation and keeping track of the current role of each of the two young generations.

Alternatively, in one or more embodiments of the invention, an identification number (ID) may be assigned to each of the two young generations, according to their current role, as well as assigned to the one or more old generations in the garbage collected heap (100). Each object may correspond to the ID of the generation where the object resides. For example in FIGS. 4 and 5, the young generation being evacuated (i.e., the first young generation (300)) may be assigned an ID of 0, the young generation being allocated (i.e., the second young generation (200)) may be assigned an ID of 1, and the old generation may be assigned an ID of 2. At various points, when the two young generations may exchange roles, the IDs are exchanged accordingly.

For example in FIG. 6, the first young generation (300) switches to become the young generation being allocated and changes its ID from 0 to 1; the second young generation (200) switches to become the young generation being evacuated and changes its ID from 1 to 0.

In one or more embodiments of the invention, the exchange of the ID may be performed while the mutator (not shown) is halted. As an example, the filtering write barrier may detect any reference contained in an object with a corresponding ID greater than that of the object pointed to by the reference. For example, in FIG. 4, the reference (174) may be detected because it is contained in object (404) with a corresponding ID of 2, which is greater that that of object (308) with the corresponding ID of 0. Although object (308) is shown in FIG. 4 as residing in the old generation, the filtering write barrier detects object (308) at the time the mutator starts to create the copied reference (174) before object (308) is evacuated from the first young generation (300).

Similarly, the reference (172) in FIG. 4 may be detected because it is contained in object (204) with a corresponding ID of 1, which is greater that that of object (308) with the corresponding ID of 0 at the time of the detection. In addition, in FIG. 4, the reference (184) may be detected because it is contained in object (402) with a corresponding ID of 2, which is greater that that of object (202) with the corresponding ID of 1. The detected references (e.g., reference (174), reference (172), and reference (184)) may then be tracked in the remembered set accordingly.

In one or more embodiments of the invention, the reference (164) may also be detected by the filtering write barrier inserted in the mutator (not shown) because it writes the copied reference (164), as shown in FIG. 3. The reference (164) may also be included in the remembered set although additional processing may not be necessary for the reference (164) as the garbage collector (not shown) may update or redirect the reference (164) along with evacuating the object (306).

In one or more embodiments of the invention, the corresponding ID of each object may be stored in a table including one entry for each object and the filtering write barrier may check the corresponding ID based on this table. In another example, each of the two young generations and the one or more old generations may be divided into multiple segments. The assigned ID may be associated with each segment and stored in a smaller table, which includes one entry for each segment. The corresponding ID of each object may be retrieved from the table by first identifying the segment, where the object resides using the address of the object. In some examples, each segment may be organized in different sizes. In other examples, each segment may be organized in the same size, where the size is chosen for each segment not to overlap more than one generation. The corresponding ID of each object may then be identified in a straightforward manner using this table and the address of the object.

Figure 7:
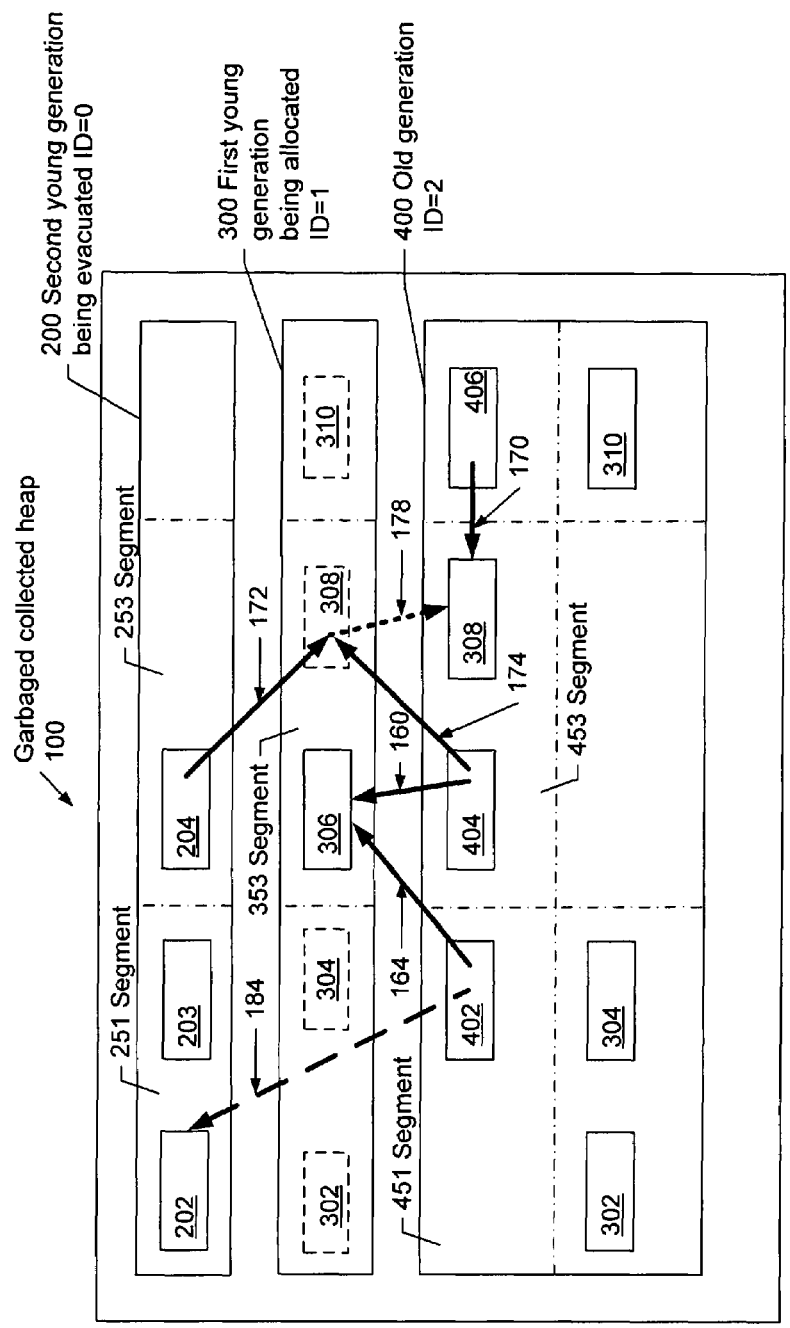
FIG. 7 shows a schematic diagram of the garbage collected heap's organization into segments in accordance with one or more embodiments of the invention.

An example of the table is shown in FIG. 7. Here, the garbage collected heap (100), the second young generation (200), the first young generation (300), and the old generation (400) are essentially the same as shown in FIG. 4 and include essentially the same objects except as discussed below. In addition, the garbage collected heap (160) is divided into twelve segments separated by the dash line grid. The various objects (e.g., object (202), object (204), object (402), and object (404)) are shown to reside in various segments (e.g., segment (251), segment (253), segment (451), and segment (453)). Also shown in FIG. 7 is the table (101), which includes one entry for each segment, e.g., entry (252), entry (254), entry (452), and entry (454) correspond to segment (251), segment (253), segment (451), and segment (453), respectively. For example, the assigned ID of each generation is shown to be associated with each segment and stored in the corresponding entry of the table (101).

Figure 8:
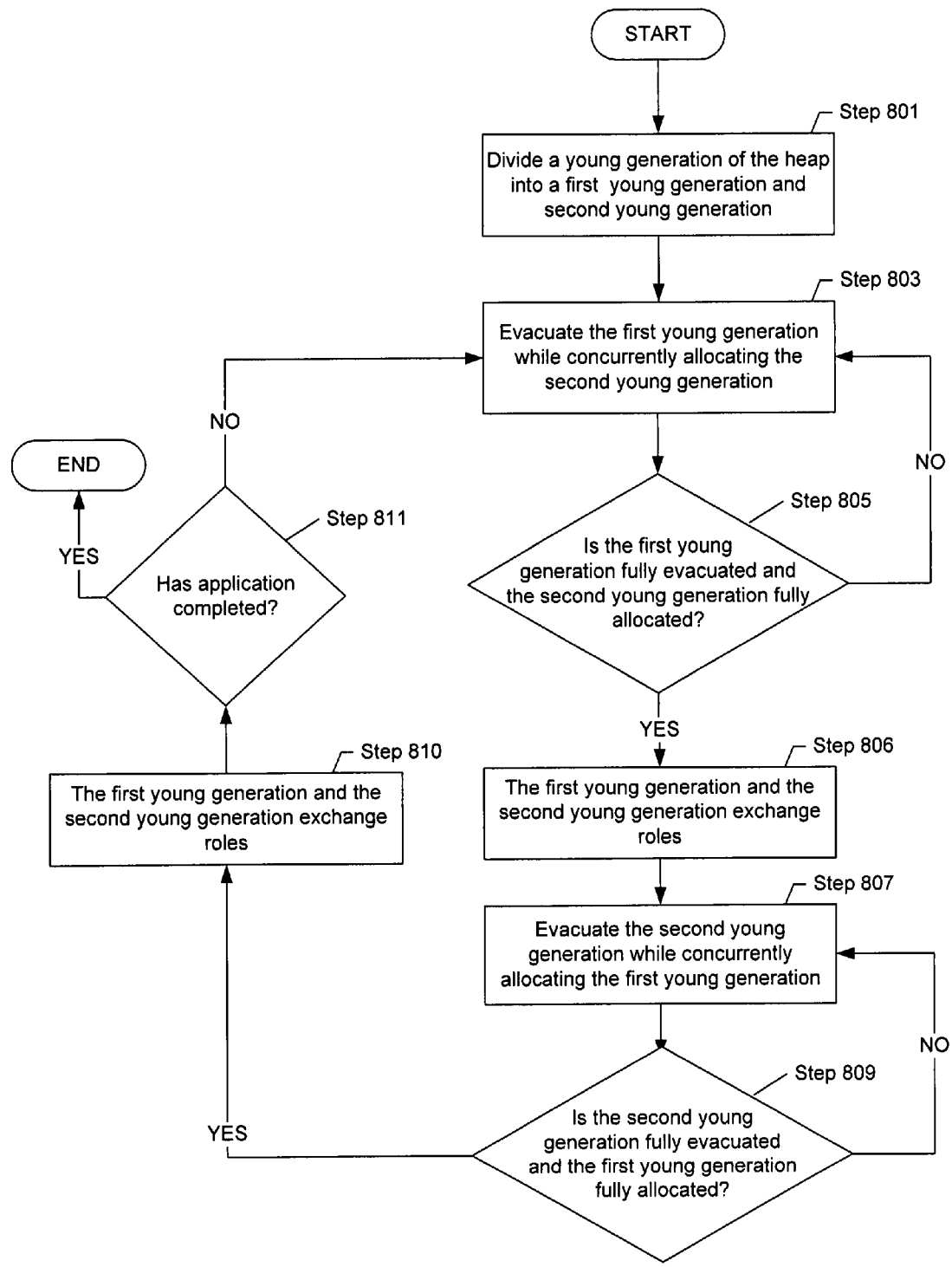
FIGS. 8 and 9 show flow charts of a method for concurrent evacuation of the young generation in accordance with one or more embodiments of the invention.
Figure 9:
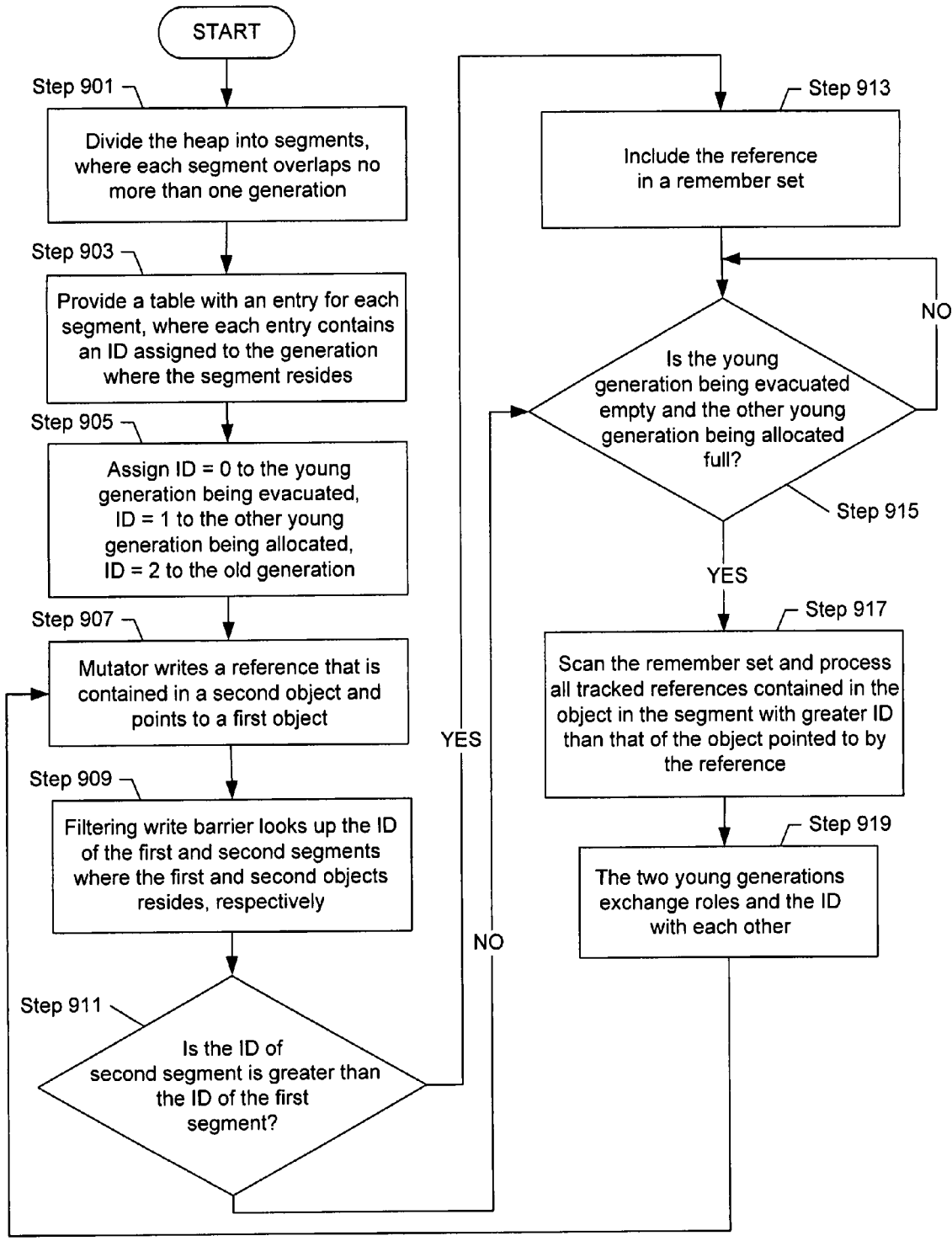

FIGS. 8 and 9 show flow charts of a method for concurrent evacuation of the young generation in accordance with one or more embodiments of the invention.

As shown in FIG. 8, initially a young generation of a generational garbage collector is divided into a first young generation and second young generation (Step 801). The garbage collector may evacuate reachable objects in the first young generation concurrently while the mutator may execute instructions, among its multiple tasks, to allocate new objects in the second young generation (Step 803).

Although not shown in detail, in one or more embodiments, the reachable objects in the first young generation may be evacuated first to a "to-space" in the young generation or a "survivor space" in the heap before being promoted to an old generation. In one or more embodiments, the reachable objects in the first young generation may be evacuated directly to the old generation.

A decision may be made in Step 805 regarding whether all reachable objects in the first young generation has been fully evacuated by the garbage collector and whether all the available space in the second young generation has been fully allocated by the mutator. If the answer is no, the method returns to Step 803 and continues to evacuate the first young generation concurrently while allocating the second young generation. If the answer in Step 805 is yes, then the two young generations exchanges roles (Step 806).

The garbage collector may then proceed to evacuate the second young generation while the mutator allocates the first young generation concurrently (Step 807). A decision may be made in Step 809 whether all reachable objects in the second young generation are fully evacuated by the garbage collector and whether all the available space in the first young generation are fully allocated by the mutator. If the answer is no, the method returns to Step 807 and continues to evacuate the second young generation concurrently while allocating the first young generation. If the answer in Step 809 is yes, then the two young generations exchange their roles again (Step 810) and a decision is made as to if the application has completed (Step 811). If the answer is no, then the method proceeds to Step 803. If the answer is no, the method ends.

As shown in FIG. 9, initially a garbage collected heap of a generational garbage collector is divided into multiple segments (Step 901). The garbage collected heap may include two young generations and an old generation, as described in reference to FIG. 8 above. In one or more embodiments, each segment may be of different size. Alternatively, each segment may be of the same size and organized so as to overlap no more than one generation.

Further, a table may be provided with an entry for each segment, where each segment may contain an ID assigned to the generation where the segment resides (Step 903). In one or more embodiments, ID=0 may be assigned to the young generation being evacuated by the garbage collector, ID=1 may be assigned to the other young generation being allocated by the mutator, and ID=2 may be assigned to the old generation (Step 905). Although the example is shown with ID=0, 1, or 2, one skilled in the art will appreciate that the invention may be practiced with other values for the assigned ID.

During the concurrent execution of the garbage collector and the mutator, the mutator may write a reference which points to a first object. The reference itself may be contained in a second object (Step 907). In one or more embodiments, the first and second objects may reside in the first and second segments. Further, the mutator may include a filtering write barrier which looks up the ID of the first and second segments from the table described in Step 903 (Step 909). The table look up may be performed in a straight-forward manner known in the art using the address of the first and second objects.

In one or more embodiments, a decision may then be made in Step 911 as to whether the ID of the second segment is greater than that of the first segment. If the answer is yes, the reference is included in a remembered set for later processing (Step 913). Similar to the examples described in detail in reference to FIG. 4, the first object may have been evacuated concurrently with the reference being created. The reference may point to an old location of the first object in the young generation being evacuated. A forwarding pointer may be installed at this old location, which may be used by a read barrier for proper operation of accesses using the reference. The remembered set may be implemented in many different formats known in the art such as a file, a list, or a card table commonly used in conjunction with the write barrier, or any other suitable data structure format.

After the reference is included in the remembered set, the method proceeds to Step 915. Otherwise, if the answer in Step 911 is no, the method proceeds directly to Step 915 where another decision is made regarding whether the young generation being evacuated is empty and whether the young generation being allocated is full. If the answer is no, the method returns to Step 915 and continues to check for the condition of the decision.

Meanwhile, one young generation may be evacuated concurrently with the other young generation being allocated, as described in reference to FIG. 8. If the answer in Step 915 is yes, then the remembered set is scanned by the garbage collector to retrieve tracked references such as the reference described in Step 913. The reference may then be processed to eliminate the forwarding pointer and be redirected to pointing to the first object directly (Step 917). At this point the method proceeds to Step 919 where the two young generations exchange roles and the assigned ID. The method then returns to Step 907.

Although the flow charts in FIGS. 8 and 9 are described separately above, the invention may be practice with both flow charts combined. Further, while the flow charts in FIGS. 8 and 9 shows checking whether the application has completed only once, one skilled in the art will appreciate that a check whether the application is completed may be check at various times in the process. Further, one skilled in the art will appreciate that a garbage collector may do coroutine mutation and collection work as shown in FIG. 9, but it need not be the case for a concurrent collector. Additionally, one skilled in the art will appreciate that the evacuation/allocation process shown in FIG. 9 may not be complete before the filtering write barrier completes—these are orthogonal sets of activities that may or may not be interleaved.

Further, one skilled in the art will appreciate that the application will be blocked while the young generation's evacuation has been completed thereby avoiding a situation where the young allocation region fills up before the young evacuation region is evacuated.

Figure 10:
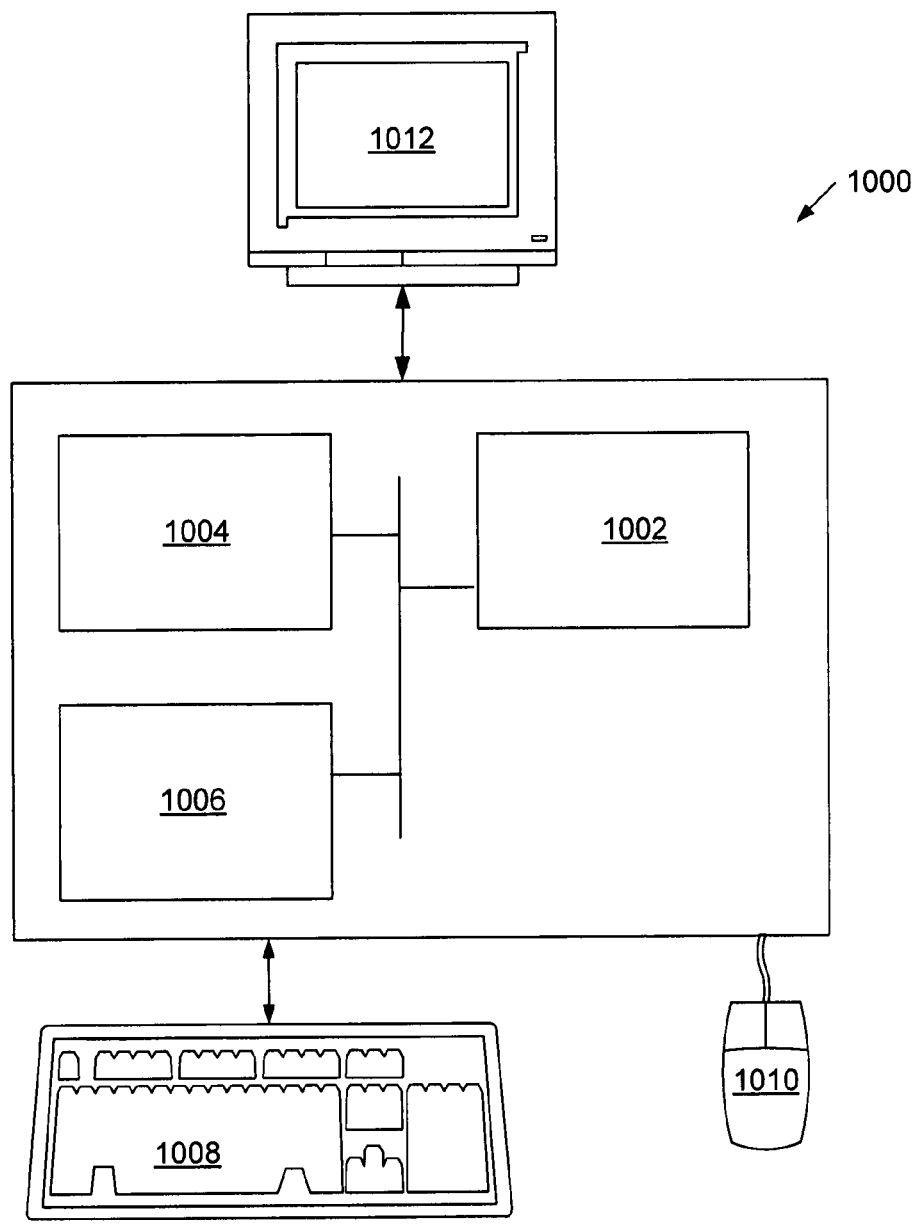
FIG. 10 shows a computer system in accordance with one or more embodiments of the invention.

The invention may be implemented on virtually any type of computer regardless of the platform being used. For example, as shown in FIG. 10, a computer system (1000) includes a processor (1002), associated memory (1004), a storage device (1006), and numerous other elements and functionalities typical of today's computers (not shown). The computer (1000) may also include input means, such as a keyboard (1008) and a mouse (1010), and output means, such as a monitor (1012). The computer system (1000) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (1000) may be located at a remote location and connected to the other elements over a network. Further, the invention may be implemented on a distributed system having a plurality of nodes, where each portion of the invention (e.g., directories in directory structure, file system engine, file system, active document, index, etc.) may be located on a different node within the distributed system. In one embodiment of the invention, the node corresponds to a computer system. Alternatively, the node may correspond to a processor with associated physical memory. The node may alternatively correspond to a processor with shared memory and resources. Further, software instructions to perform embodiments of the invention may be stored on a computer readable medium such as a compact disc (CD), a diskette, a tape, a file, or any other computer readable storage device.

It will be understood from the foregoing description that various modifications and changes may be made in the preferred and alternative embodiments of the present invention without departing from its true spirit. For example, the method may be performed in a different sequence, method steps may be performed by different components, the components provided may be integrated or separate, the devices included herein may be manually and/or automatically activated to perform the desired operation. The activation may be performed as desired and/or based on data generated, conditions detected and/or analysis of results from the application.

While the invention has been described with respect to a limited number of embodiments and advantages, those skilled in the art, having benefit of this disclosure, will appreciate that other embodiments and advantages can be devised which do not depart from the scope of the invention as disclosed herein. Accordingly, the scope of the invention should be limited only by the attached claims.

What is claimed is:

1. A method for performing generational garbage collection on a heap comprising a plurality of generations, the method comprising:
    dividing a young generation of the heap into a first young generation and a second young generation;
    evacuating the first young generation concurrently with allocating the second young generation; and
    evacuating the second young generation concurrently with allocating the first young generation and subsequent to fully evacuating the first young generation.

2. The method of claim 1, further comprising:
    writing a reference, wherein the reference points to a first object, wherein the first object is one of a group consisting of the first young generation and the second young generation; and
    updating the reference according to a forwarding pointer of the first object subsequent to fully evacuating the first young generation and prior to evacuating the second young generation,
    wherein the updating is performed while access to the heap separate from the generational garbage collection is halted.

3. The method of claim 2,
    wherein writing the reference is executed by a mutator,
    wherein the mutator comprises a filtering write barrier for keeping track of writing of the reference,
    wherein keeping tracking of writing of the reference comprises including the reference in a remembered set by the filtering write barrier according to the first object and a second object containing the reference, and
    wherein access to the heap, separate from the generational garbage collection, is executed by the mutator.

4. The method of claim 3, wherein updating the reference comprises scanning the remembered set and retrieving the reference from the remembered set, and wherein the reference is deleted from the remembered set subsequent to updating.

5. The method of claim 3, further comprising:
    assigning a first value to one of a group consisting of the first young generation and the second young generation being evacuated;
    assigning a second value to one of a group consisting of the first young generation and the second young generation being allocated; and
    assigning a third value to an old generation of the heap,
    wherein the reference is included in the remembered set by the filtering write barrier according to the value assigned to the one of a group consisting of the first young generation and the second young generation containing the first object and the value assigned to a first generation containing the second object.

6. The method of claim 5, further comprising:
    dividing the heap into segments, wherein each segment overlaps no more than one generation; and
    providing a table with an entry for each segment, wherein each entry comprises the value assigned to one of one of a group consisting of the first young generation and the second young generation containing the segment,
    wherein the filtering write barrier retrieves, from the table, the value assigned to one of a group consisting of the first young generation and the second young generation containing the first object and the value assigned to the first generation containing the second object.

7. The method of claim 2, further comprising:
    executing a read barrier by the mutator for ensuring an access to the first object is correct, and
    redirecting the access by the read barrier according to the forwarding pointer.

8. The method of claim 2, further comprising:
    executing a read barrier by the mutator for ensuring an access to the first object is correct, and
    blocking the access until evacuation of the first object is complete.

9. The method of claim 1, further comprising:
    keeping track of writing a reference, wherein the reference points to a first object, wherein the first object is one of a group consisting of the first young generation and the second young generation; and
    updating the reference according to a forwarding pointer of the first object subsequent to evacuating the second young generation and prior to evacuating the first young generation,
    wherein the updating is performed while access to the heap separate from the generational garbage collection is halted.

10. The method of claim 9, further comprising:
wherein writing the reference is executed by a mutator,
wherein the mutator comprises a filtering write barrier for keeping track of writing of the reference,
wherein keeping tracking of writing of the reference comprises including the reference in a remembered set by the filtering write barrier according to the first object and a second object containing the reference, and
wherein access to the heap separate from the generational garbage collection is executed by the mutator.

11. The method of claim 10, wherein updating the reference comprises scanning the remembered set and retrieving the reference from the remembered set, and wherein the reference is deleted from the remembered set subsequent to updating.

12. The method of claim 10, further comprising:
assigning a first value to one of a group consisting of the first young generation and the second young generation being evacuated;
assigning a second value to one of a group consisting of the first young generation and the second young generation being allocated; and
assigning a third value to an old generation of the heap,
wherein the reference is included in the remembered set by the filtering write barrier according to the value assigned to the one of a group consisting of the first young generation and the second young generation containing the first object and the value assigned to a first generation containing the second object.

13. A computer readable storage medium, embodying instructions executable by the computer to perform method steps for performing generational garbage collection on a heap, the instructions comprising functionality to:
divide a young generation of the heap into a first young generation and a second young generation;
evacuate the first young generation concurrently with allocating the second young generation; and
evacuate the second young generation concurrently with allocating the first young generation and subsequent to fully evacuating the first young generation.

14. The computer readable storage medium of claim 13, further comprising the instructions comprising functionality to:
write a reference, wherein the reference points to a first object, wherein the first object is one of a group consisting of the first young generation and the second young generation; and
update the reference according to a forwarding pointer of the first object subsequent to fully evacuating the first young generation and prior to evacuating the second young generation,
wherein the updating is performed while access to the heap separate from the generational garbage collection is halted.

15. The computer readable storage medium of claim 14, wherein the instructions comprising functionality to write the reference is executed by a mutator,
wherein the mutator comprises a filtering write barrier for keeping track of writing of the reference,
wherein keeping tracking of writing of the reference comprises including the reference in a remembered set by the filtering write barrier according to the first object and a second object containing the reference, and
wherein access to the heap, separate from the generational garbage collection, is executed by the mutator.

16. The computer readable storage medium of claim 15, wherein the instructions comprising functionality to update the reference comprises scanning the remembered set and retrieving the reference from the remembered set, and wherein the reference is deleted from the remembered set subsequent to updating.

17. A computer system comprising:
a memory comprising a set of instructions; and
a processor operatively coupled to the memory, wherein the processor executes the set of instructions to:
divide a young generation of the heap into a first young generation and a second young generation;
evacuate the first young generation concurrently with allocating the second young generation; and
evacuate the second young generation concurrently with allocating the first young generation and subsequent to fully evacuating the first young generation.

18. The computer system of claim 17, wherein the processor executes the set of instructions to:
write a reference, wherein the reference points to a first object, wherein the first object is one of a group consisting of the first young generation and the second young generation; and
update the reference according to a forwarding pointer of the first object subsequent to fully evacuating the first young generation and prior to evacuating the second young generation,
wherein the updating is performed while access to the heap separate from the generational garbage collection is halted.

19. The computer system of claim 18,
wherein the processor executes the set of instructions to write the reference is executed by a mutator,
wherein the mutator comprises a filtering write barrier for keeping track of writing of the reference,
wherein keeping tracking of writing of the reference comprises including the reference in a remembered set by the filtering write barrier according to the first object and a second object containing the reference, and
wherein access to the heap, separate from the generational garbage collection, is executed by the mutator.

20. The computer system of claim 19, wherein the processor executes the set of instructions to update the reference comprises scanning the remembered set and retrieving the reference from the remembered set, and wherein the reference is deleted from the remembered set subsequent to updating.

* * * * *